(12) United States Patent
Martin

(10) Patent No.: US 8,211,960 B2
(45) Date of Patent: Jul. 3, 2012

(54) CRUMB RUBBER MODIFIED ASPHALT WITH IMPROVED STABILITY

(75) Inventor: Jean-Valery Martin, Princeton, NJ (US)

(73) Assignee: Innophos, Inc., Cranbury, NJ (US)

( * ) Notice: Subject to any disclaimer, the term of this patent is extended or adjusted under 35 U.S.C. 154(b) by 36 days.

(21) Appl. No.: 12/903,786

(22) Filed: Oct. 13, 2010

(65) Prior Publication Data

US 2011/0160356 A1   Jun. 30, 2011

Related U.S. Application Data

(60) Provisional application No. 61/251,163, filed on Oct. 13, 2009.

(51) Int. Cl.
*C08L 95/00* (2006.01)

(52) U.S. Cl. .............................. 524/68; 524/71
(58) Field of Classification Search ............... 524/68–71
See application file for complete search history.

(56) References Cited

U.S. PATENT DOCUMENTS 7,901,563 B2 *   3/2011   Ruan et al. ................. 208/6

* cited by examiner

*Primary Examiner* — Peter Szekely
(74) *Attorney, Agent, or Firm* — Joanne P. Will

(57) ABSTRACT

The present invention relates to a method for producing a crumb rubber modified asphalt comprising the steps of:
a) heating a pre-selected quantity of asphalt to a temperature of between about 325° F. to 550° F.;
b) adding crumb rubber and a mineral acid to the heated asphalt with stirring; and
c) blowing air through the asphalt, crumb rubber and mineral acid mixture.

6 Claims, No Drawings

CRUMB RUBBER MODIFIED ASPHALT WITH IMPROVED STABILITY

CROSS REFERENCE TO RELATED APPLICATIONS

The present application claims priority from U.S. Provisional Application 61/251,163 filed Oct. 13, 2009, the entire contents of which is hereby incorporated by reference.

BACKGROUND OF THE INVENTION

A. Field of the Invention

Asphalt is used for a variety of purposes, including especially use in asphalt road paving systems and in roofing materials. The availability of asphalt materials has been reduced in recent years, while the cost of these materials has been increasing. For these and other reasons, there is great interest in finding ways to extend the useful life of asphalt containing products. In addition, asphalt road pavement and roofing materials may be exposed to a wide variety of weather conditions, including temperatures from below freezing to 100° F. or more. At colder temperatures, asphalt can become brittle and crack, while at higher temperatures, asphalt can permanently deform, for example by rutting in road pavements. Therefore, modifications that extend or improve the properties of asphalt in cold or hot conditions are also desirable.

Crumb rubber has been used is asphalt for decades to modify the properties of the asphalt. Crumb rubber may be obtained from grinding waste rubber products, such as for example rubber shoe soles. One of the most common sources of crumb rubber is ground tire rubber (GTR). It will be understood that references to GTR in the following description of the invention includes any source of rubber crumb that is suitable for addition to asphalt.

The mixing of GTR in asphalt or bitumen typically can lead to a heterogeneous blend with a liquid part and a solid material. The solid material settles when agitation of the GTR/asphalt mixture is stopped. The solid material is primarily carbon black, which has a significant negative impact on the workability of the GTR modified asphalt. The solid material mainly affects the viscosity and storage stability of the GTR modified asphalt. As a result of these drawbacks, the use of GTR in asphalt has been limited to some specific processes requiring special equipment. This can significantly increase the cost of pavement produced using the GTR modified asphalt.

B. Description of the Related Art

One prior process for producing GTR modified asphalt is described in International Patent Publication No. WO 95/20623. In the processes described in WO 95/20623, the GTR/asphalt mixture is heated and bombarded with air at a temperature of 350° and 470° F. The air is supplied at about 2200 cfm and 10 psi. The hot air dehydrogenates the GTR and homogenizes the GTR/asphalt mixture.

It would be desirable to have a process for producing GTR modified asphalt that allows use of conventional air blowing equipment in a more efficient way.

SUMMARY OF THE INVENTION

The present invention relates to a method for producing a crumb rubber modified asphalt comprising the steps of:
a) heating a pre-selected quantity of asphalt to a temperature of between about 325° F. to 550° F.;
b) adding crumb rubber and a mineral acid to the heated asphalt with stirring; and
c) blowing air through the asphalt, crumb rubber and mineral acid mixture.

DETAILED DESCRIPTION OF INVENTION

The present invention is directed to an improved process for producing GTR modified asphalt. A mineral acid, preferably polyphosphoric acid, is added to a GTR/asphalt mixture under conditions similar to those used when making a roofing grade asphalt. The process is able to produce a more stable GTR modified asphalt at lower process temperatures and at a high production rate. In addition, the air flow rates used in the process are typical of those used to produce air blown asphalt. Accordingly, any facility having a blowing still can produce GTR modified asphalt using the process described below. The GTR modified asphalt is suitable for paving, coatings or industrial applications.

Any asphalt or asphalt blend can be used in the process. The asphalt is heated to a temperature between about 325° F. to about 550° F. The GTR and the mineral acid are added to the heated asphalt and mixed with stirring. The GTR may be as large as 10 mesh or may be 200 mesh or smaller. GTR is added to achieve a level of from about 0.5% to about 25% by weight GTR of the weight of the GTR/asphalt/acid mixture.

Any mineral acid may be used in the process. Preferably, the acid is polyphosphoric acid. The acid is added to achieve an acid level of between about 0.05% to 5% of the weight of the GTR/asphalt/acid mixture. Air is blown through the mixture at a rate of about 0.5 cfm to 2.0 cfm, preferably 1.1 cfm.

The GTR, asphalt and mineral acid combination is preferably mixed for a period of between about 1 hour to 24 hours while air is blown through the mixture.

The following non limiting examples illustrate the practice and utility of the present invention:

EXAMPLE 1

| Condition | |
|---|---|
| asphalt | Lion Flux |
| GTR | 40 mesh |
| INNOVALT R (PPA) | 115% |
| Time | 6 h |
| Temperature | 440 F. |
| Air flow | 1.1 cfm |

| Parameter | 10% GTR | 10% GTR + 1% PPA |
|---|---|---|
| Asphalt ID | | |
| SP (C.) | 48.5 | 55.5 |
| Pen (1/10 mm) | 90 | 75 |
| Viscosity, Brookfield, 135 C. (cP) | 590 | 680 |
| Storage stability, 163 C. | 2.7 | 0 |
| PG True Grade | 66-29.5 | 71.3-24.9 |

EXAMPLE 2

Re-do of Example 1

| Condition | |
|---|---|
| asphalt | Lion Flux |
| GTR | 40 mesh |
| INNOVALT R (PPA) | 115% |
| Time | 6 h |
| Temperature | 440 F. |

-continued

| Air flow | 1.1 cfm | |
|---|---|---|
| Parameter | 10% GTR | 10% GTR + 1% PPA |
| Asphalt ID | DI404098 | DL404100 |
| SP (C.) | 56.2 | 61.85 |
| Pen (1/10 mm) | 55 | 55 |
| Viscosity, Brookfield, 135 C. (cP) | 776 | 1180 |
| Storage stability, 163 C. | 0.7 | 0.1 |
| PG True Grade | 74.5-18.71 | 81.2-14.43 |

The abbreviations used in the preceding examples are defined accordingly:
SP is softening point
Pen is penetration
PG is performance grading
ER is elastic recovery The combination of PPA and crumb rubber compared to a crumb rubber modified asphalt leads to an increase in the softening point (SP) while improving the storage stability and Performance grade (PG) of the asphalt.

I claim:

1. A method for producing a crumb rubber modified asphalt comprising the steps of:
    a) heating a pre-selected quantity of asphalt to a temperature of between about 325° F. to 550° F.;
    b) adding crumb rubber and a mineral acid to the heated asphalt with stirring; and
    c) blowing air through the asphalt, crumb rubber and mineral acid mixture.

2. The method of claim 1, wherein the crumb rubber is ground tire rubber and is added to achieve a crumb rubber level of between about 0.5% to 25% by weight of the weight of the asphalt, crumb rubber and mineral acid mixture.

3. The method of claim 2, wherein the crumb rubber has a mesh size between about 10 mesh and about 200 mesh.

4. The method of claim 3, wherein the mineral acid is polyphosphoric acid and is added to achieve an acid level of between about 0.05% to about 5% by weight of the weight of the asphalt, crumb rubber and mineral acid mixture.

5. The method of claim 4, further comprising the step of blowing air through the asphalt, crumb rubber and mineral acid mixture while stirring.

6. The method of claim 5, wherein the asphalt, crumb rubber and mineral acid mixture is stirred for a period of between about 1 hour and about 24 hours.

* * * * *